United States Patent
Jia et al.

(10) Patent No.: US 7,925,075 B2
(45) Date of Patent: Apr. 12, 2011

(54) INSPECTION SYSTEM AND METHODS WITH AUTOCOMPENSATION FOR EDGE BREAK GAUGING ORIENTATION

(75) Inventors: Ming Jia, Shanghai (CN); Guiju Song, Shanghai (CN); Jianming Zheng, Shanghai (CN); Yu Ning, Beijing (CN); Kevin George Harding, Niskayuna, NY (US); Gil Abramovich, Niskayuna, NY (US); Joseph Benjamin Ross, Cincinnati, OH (US); Ralph Gerald Isaacs, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 1009 days.

(21) Appl. No.: 11/745,010

(22) Filed: May 7, 2007

(65) Prior Publication Data

US 2008/0281543 A1 Nov. 13, 2008

(51) Int. Cl.
G06K 9/00 (2006.01)
G06K 9/48 (2006.01)
G06C 9/00 (2006.01)
(52) U.S. Cl. ......... 382/149; 382/145; 382/199; 702/150
(58) Field of Classification Search .................. 382/145, 382/148, 149, 199; 702/150
See application file for complete search history.

(56) References Cited

U.S. PATENT DOCUMENTS

| | | | |
|---|---|---|---|
| 5,175,601 A * | 12/1992 | Fitts | 356/604 |
| 6,084,712 A | 7/2000 | Harding | |
| 6,173,070 B1 * | 1/2001 | Michael et al. | 382/145 |
| 6,219,442 B1 * | 4/2001 | Harper et al. | 382/141 |
| 6,224,459 B1 * | 5/2001 | Stocker et al. | 451/5 |
| 6,229,913 B1 | 5/2001 | Nayar et al. | |
| 6,252,623 B1 | 6/2001 | Lu et al. | |
| 6,438,272 B1 | 8/2002 | Huang et al. | |
| 6,539,107 B1 * | 3/2003 | Michael et al. | 382/154 |
| 6,539,326 B1 * | 3/2003 | Hirano | 702/150 |
| 6,603,103 B1 * | 8/2003 | Ulrich et al. | 250/205 |
| 6,636,255 B1 | 10/2003 | Kobayashi et al. | |
| 6,788,210 B1 | 9/2004 | Huang et al. | |
| 6,825,937 B1 | 11/2004 | Gebauer et al. | |
| 6,841,780 B2 * | 1/2005 | Cofer et al. | 250/341.1 |
| 6,868,175 B1 * | 3/2005 | Yamamoto et al. | 382/145 |
| 6,873,421 B2 * | 3/2005 | Lim et al. | 356/605 |
| 6,895,108 B2 * | 5/2005 | Kim | 382/145 |
| 6,910,278 B2 * | 6/2005 | Holder | 33/562 |
| 6,912,888 B2 | 7/2005 | Stierle et al. | |
| 6,959,108 B1 * | 10/2005 | Bartelt et al. | 382/141 |
| 7,009,690 B2 * | 3/2006 | Kamon et al. | 356/3 |
| 7,109,511 B2 * | 9/2006 | Inenaga et al. | 250/559.36 |
| 7,348,585 B2 * | 3/2008 | Miyakawa et al. | 250/559.41 |
| 7,394,926 B2 * | 7/2008 | Bryll et al. | 382/141 |
| 7,489,408 B2 * | 2/2009 | Harding et al. | 356/603 |

(Continued)

*Primary Examiner* — Bhavesh M Mehta
*Assistant Examiner* — Mia M Thomas
(74) *Attorney, Agent, or Firm* — Penny A. Clarke

(57) ABSTRACT

A method for inspecting a feature of a part is provided. The method includes obtaining a profile corresponding to the feature using a sensor and projecting the profile onto a compensation plane normal to the feature for generating an updated profile. The method also includes using the updated profile for reducing a measurement error caused by an orientation of the sensor. An inspection system is also provided. The inspection system includes a sensor configured to capture a fringe image of a feature on a part. The inspection system further includes a processor configured to process the fringe image to obtain an initial profile of the feature and to project the initial profile onto a compensation plane normal to the feature.

15 Claims, 7 Drawing Sheets

U.S. PATENT DOCUMENTS

| | | | | |
|---|---|---|---|---|
| 7,499,830 B2* | 3/2009 | Harding et al. | | 702/167 |
| 7,574,035 B2* | 8/2009 | Koonankeil | | 382/152 |
| 7,660,455 B2* | 2/2010 | Yamamoto et al. | | 382/141 |
| 7,747,572 B2* | 6/2010 | Scott et al. | | 707/636 |
| 2001/0012388 A1* | 8/2001 | Muller et al. | | 382/141 |
| 2002/0087368 A1* | 7/2002 | Jin et al. | | 705/7 |
| 2002/0100872 A1* | 8/2002 | Hiroi et al. | | 250/310 |
| 2002/0131633 A1* | 9/2002 | Zwick et al. | | 382/152 |
| 2002/0191833 A1* | 12/2002 | Kim | | 382/149 |
| 2003/0030638 A1* | 2/2003 | Astrom et al. | | 345/420 |
| 2005/0031191 A1* | 2/2005 | Venkatachalam | | 382/152 |
| 2005/0036671 A1* | 2/2005 | Watkins et al. | | 382/145 |
| 2005/0089210 A1* | 4/2005 | Muller et al. | | 382/141 |
| 2005/0092875 A1* | 5/2005 | Carnevali | | 248/160 |
| 2005/0169512 A1* | 8/2005 | Fang et al. | | 382/141 |
| 2005/0201611 A1* | 9/2005 | Lloyd et al. | | 382/152 |
| 2005/0213807 A1* | 9/2005 | Wasserman | | 382/152 |
| 2005/0226494 A1* | 10/2005 | Yamamoto et al. | | 382/149 |
| 2006/0156566 A1* | 7/2006 | Ingram et al. | | 33/554 |
| 2006/0253289 A1* | 11/2006 | Kymal et al. | | 705/1 |
| 2007/0109558 A1* | 5/2007 | Harding et al. | | 356/604 |
| 2007/0112543 A1* | 5/2007 | Harding et al. | | 702/167 |
| 2007/0183666 A1* | 8/2007 | Ding | | 382/199 |
| 2008/0130982 A1* | 6/2008 | Kitamura et al. | | 382/144 |
| 2009/0122304 A1* | 5/2009 | Jin et al. | | 356/237.4 |
| 2009/0196489 A1* | 8/2009 | Le | | 382/148 |
| 2009/0218491 A1* | 9/2009 | Morokuma et al. | | 250/310 |
| 2009/0303465 A1* | 12/2009 | Clements et al. | | 356/124 |
| 2010/0014747 A1* | 1/2010 | Freifeld | | 382/141 |
| 2010/0303334 A1* | 12/2010 | Kitamura et al. | | 382/141 |

* cited by examiner

INSPECTION SYSTEM AND METHODS WITH AUTOCOMPENSATION FOR EDGE BREAK GAUGING ORIENTATION

BACKGROUND

The invention relates generally to inspection methods for machined parts and, more particularly, to methods for inspecting an edge break of a part.

Inspection of features of a machined part is desirable to ensure that such features are appropriately configured or shaped to achieve suitable mechanical properties. For example, in parts such as turbine airfoils, compressor fans, blade roots etc., a sharp edge break or a discontinuity may result in a section of the part that may wear out quickly or crack when subjected to thermal and/or mechanical stress. Therefore, it is desirable to obtain an accurate measurement and characterization of such edge breaks.

Typically, edge breaks on the parts are performed by hand benching methods and the measurement and analysis of such edge breaks is through a manual process. In such systems, an image of the target edge break is obtained through a sensor and such image data is analyzed to determine the quality of the edge break. Unfortunately, since orientation of an edge measurement tool is manually performed, undesirable variation in the characterization of the edge breaks may be introduced due to differences in the training and/or skill level of the operator. For example, the variation of the sensor orientation from different operators may result in reduced measurement repeatability and accuracy.

In certain systems, the sensor tip is designed to ensure that the measured target edge break is in the working field of the sensor. Further, if the tilting angle of the sensor is too large, the live display image will be out of focus of the sensor. Such sensor configuration is not able to accurately reduce the error introduced due to the sensor orientation. In certain other systems, projected line based systems are employed to inspect the quality of edge breaks. Typically, a single line is projected onto the edge break and triangulation method is employed to determine the profile of the edge break. However, if the sensor is tilted then the profile is not normal to the edge. Further, the tilt of the sensor causes focus errors that may not be corrected through the single line projection technique.

Accordingly, it would be desirable to develop inspection techniques that accurately characterize an edge break by reducing the error due to the variation in the sensor orientation.

BRIEF DESCRIPTION

Briefly, according to one embodiment of the invention, a method for inspecting a feature of a part is provided. The method includes obtaining a profile corresponding to the feature using a sensor and projecting the profile onto a compensation plane normal to the feature for generating an updated profile. The method also includes using the updated profile for reducing a measurement error caused by an orientation of the sensor.

In another embodiment, an inspection system is provided. The inspection system includes a sensor configured to capture a fringe image of a feature on a part and a processor configured to process the fringe image to obtain an initial profile of the feature and to project the initial profile onto a compensation plane normal to the feature.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
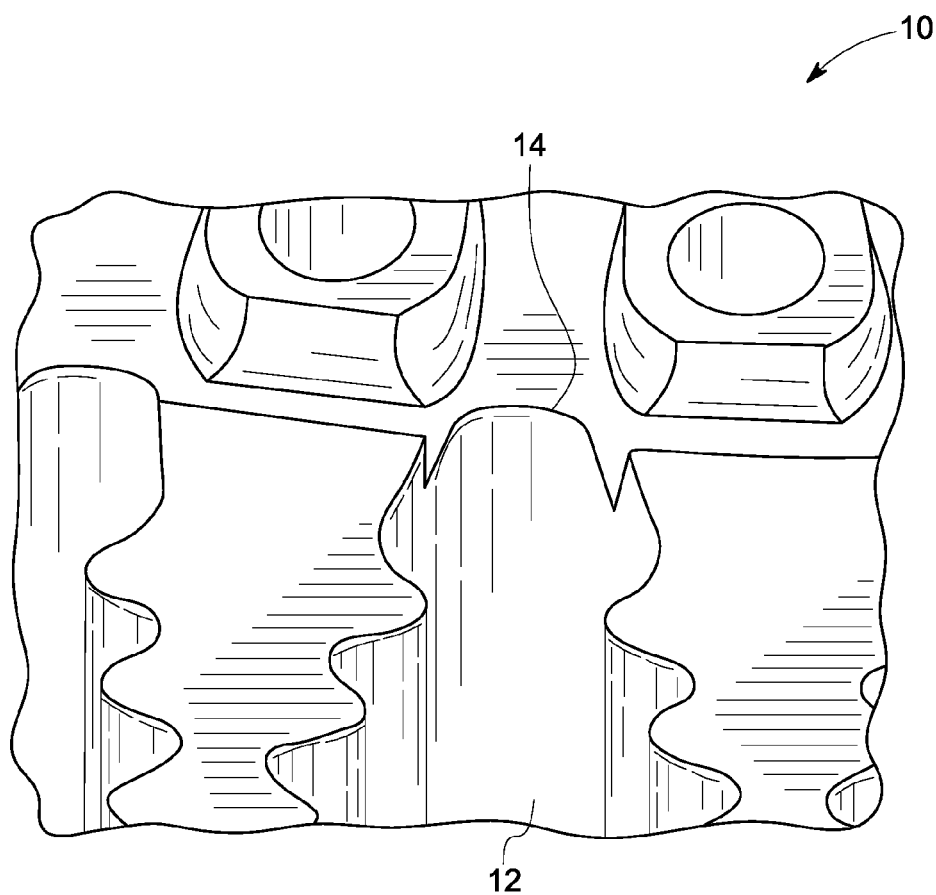
FIG. 1 illustrates an exemplary part having a slot with an edge break.

As discussed in detail below, embodiments of the present invention function to provide an inspection system that provides an accurate characterization of an edge break of a part by reducing an error due to the variation in the sensor orientation. In particular, the present invention provides an inspection system with auto compensation for edge break gauging orientation through calibration of a measured profile data corresponding to the edge break of the part. Referring now to the drawings, FIG. 1 illustrates an exemplary part 10 such as a blade root for a turbine blade having a slot 12 that includes an edge break 14. In the illustrated example, the edge break 14 includes a chamfer with rounded corners As used herein, the term "edge break" refers to part features and geometric discontinuities that could give rise to edge sharpness, such as may be encountered in a chamfer, bevel, fillet and other part features. The quality of the edge break 14 of a part such as the slot 12 is characterized using an inspection system that will be described below with reference to FIG. 2.

Figure 2:
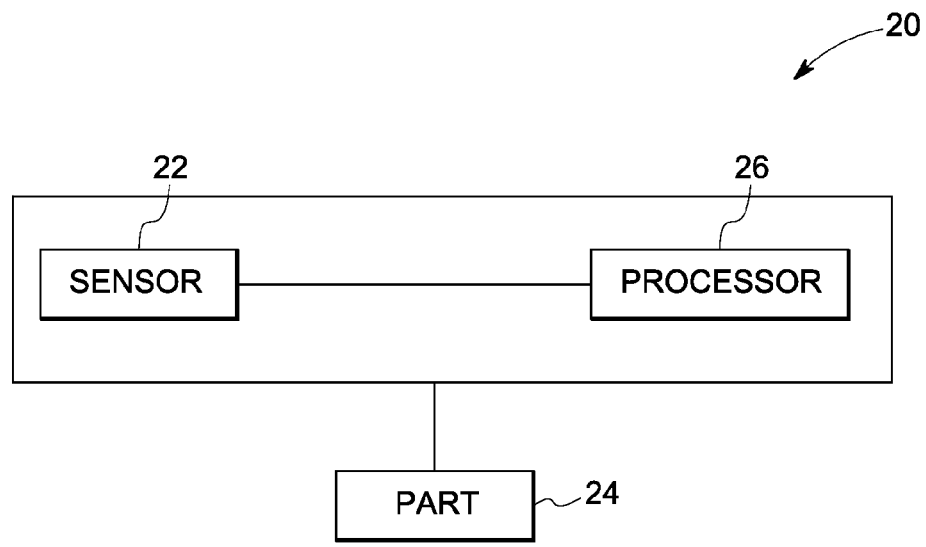
FIG. 2 is a diagrammatical representation of an inspection system for inspecting the edge break of FIG. 1, in accordance with an exemplary embodiment of the present technique.

FIG. 2 is a diagrammatical representation of an inspection system 20 for inspecting the edge break 14 of FIG. 1, in accordance with an exemplary embodiment of the present technique. The inspection system 20 includes a sensor 22 configured to capture a fringe image of a feature on a part 24. In one exemplary embodiment, the feature includes an edge break of the part 24. Further, the inspection system 20 includes a processor 26 configured to process the fringe image to obtain an initial profile of the feature and to project the initial profile onto a compensation plane normal to the feature. Beneficially, the calibration of the initial profile corresponding to the edge break of the part by projecting the profile onto the compensation plane facilitates reduction in a measurement error caused by an orientation of the sensor 22.

Figure 3:
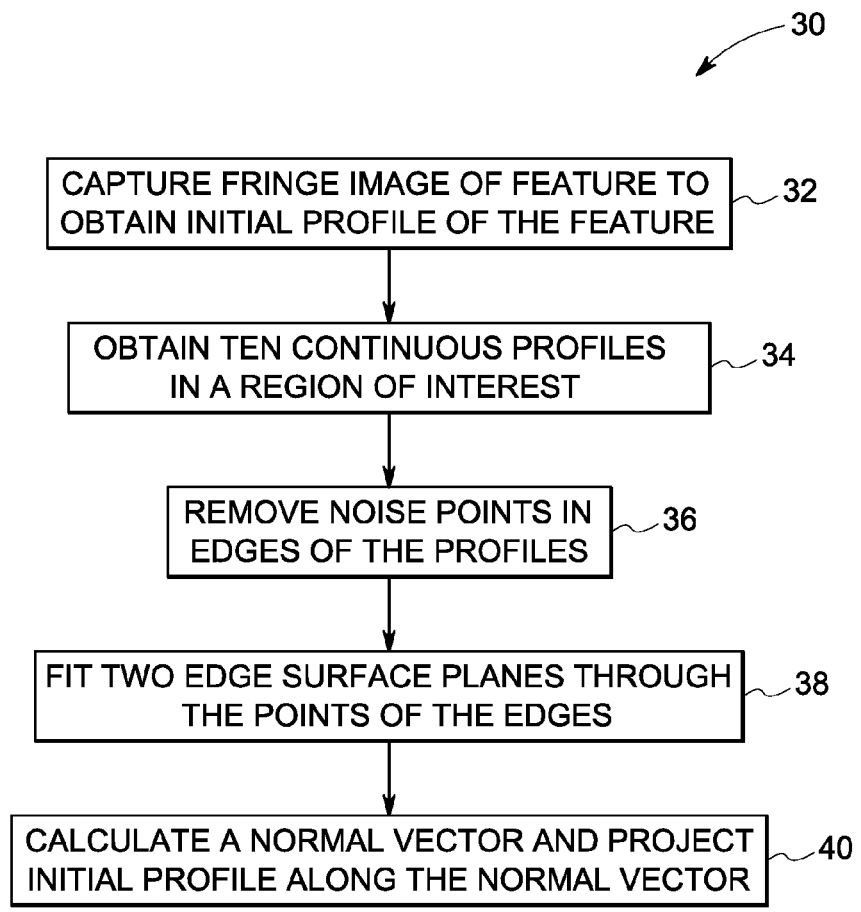
FIG. 3 is a flow chart illustrating a method for inspecting a feature of a part using the inspection system of FIG. 2.

It should be noted that the present invention is not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art FIG. 3 is a flow chart illustrating a method 30 for inspecting a feature such as an edge break of the part 24 (see FIG. 2) using the inspection system 20 of FIG. 2. As illustrated, a fringe image of the feature is captured through the sensor 22 (see FIG. 2) to obtain an initial profile of the feature (step 32). At step 34, a plurality of profiles are obtained in a region of interest of the part 24. In this exemplary embodiment, about ten profiles are obtained in the region of interest. However, a greater or lesser profiles may be obtained based upon the initial profile. The plurality of profiles include a plurality of edges. In this embodiment, a plurality of data points corresponding to the plurality of profiles are extracted and data points corresponding to noise are removed from the edges of the profiles (step 36). The data points corresponding to noise may be removed using trimming of the profiles by performing line fitting and at least one Graham scan as will be described below with reference to FIGS. 7-10. At step 38, two edge surface planes are fitted through the extracted points of the edges. Further, at step 40, a normal vector is calculated and the initial profile is projected along the normal vector. In this exemplary embodiment, the initial profile is projected onto a compensation plane normal to the feature for generating an updated profile. Further, such updated profile is used to reduce the measurement error caused by the orientation of the sensor 22 for determining the quality of the feature.

Figure 4:
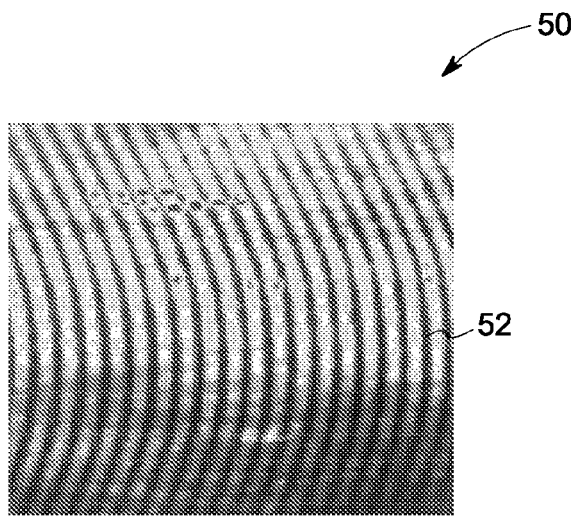
FIG. 4 illustrates an exemplary fringe pattern corresponding to the edge break of FIG. 1 captured using the inspection system of FIG. 2.

FIG. 4 illustrates an exemplary fringe image 50 corresponding to the edge break 14 of FIG. 1 captured using the inspection system 20 of FIG. 2. The fringe image 50 includes a plurality of imaging fringe patterns 52, corresponding to the edge break 14, as may be obtained with the sensor 22 (see FIG. 2). In this exemplary embodiment, an operator places the sensor 22 near the part 10 to capture the fringe image 50 of the edge break 14. A beam of structured light is projected onto the edge break 14 through the sensor 22. Further, a reflected light from the edge break 14 is received by a camera (not shown) to generate the fringe image 50 of the edge break 14. In this embodiment, the camera is integrated with the sensor 22.

Figure 5:
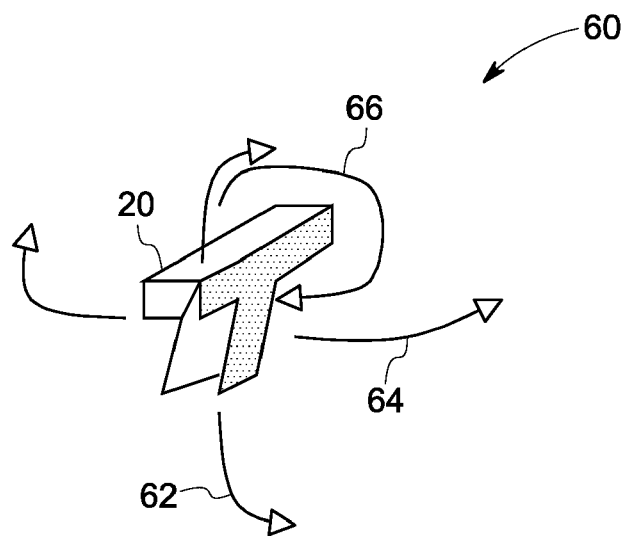
FIG. 5 illustrates exemplary sensor orientations of the sensor employed in the inspection system of FIG. 2.

It should be noted that since the measurement process is a manual operation any variation of the sensor orientation from different operators substantially affects the measurement accuracy. FIG. 5 illustrates exemplary sensor orientations 60 of the sensor 22 employed in the inspection system 20 of FIG. 2. As illustrated, the sensor 22 may have an orientation with three different angular values such as pitch, yaw and roll as represented by reference numerals 62, 64 and 66. Variations in the orientation 60 of the sensor results in a measurement error that may be reduced by the auto compensation technique as described above. In particular, a profile corresponding to the edge break 14 is obtained using the sensor 22.

Further, an orientation of the edge break 14 is determined such that a cross-section of data along the profile is being measured normal to a major axis of the edge break 14.

Figure 6:
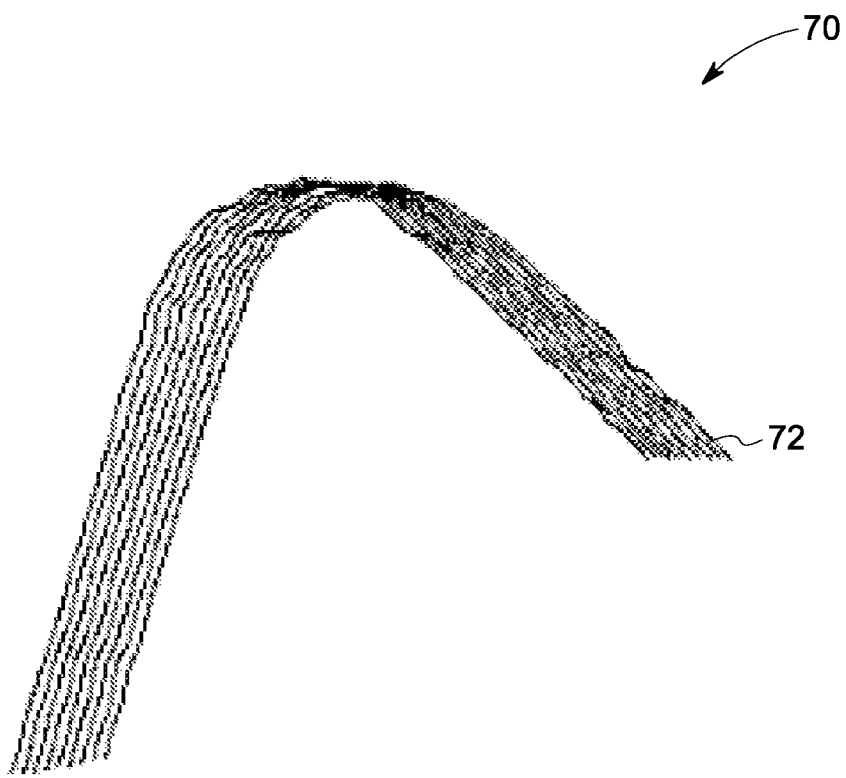
FIG. 6 is a graphical representation of exemplary profiles extracted from the fringe pattern of FIG. 4.

The fringe image 50 of FIG. 4 is processed by the processor 26 (see FIG. 2) to obtain an initial profile corresponding to the edge break 14. FIG. 6 is a graphical representation of exemplary profiles 70 extracted from the fringe pattern 52 of FIG. 4. As illustrated, a plurality of profiles such as represented by reference numeral 72 are extracted from the fringe image 52. In one exemplary embodiment, at least ten profiles are extracted from the fringe pattern 52 corresponding to the edge break 14. Next, a plurality of data points corresponding to noise are removed from the edges of each of the profiles 72. In the illustrated embodiment, the profiles 72 are trimmed by performing line fitting and at least one Graham scan.

Figure 7:
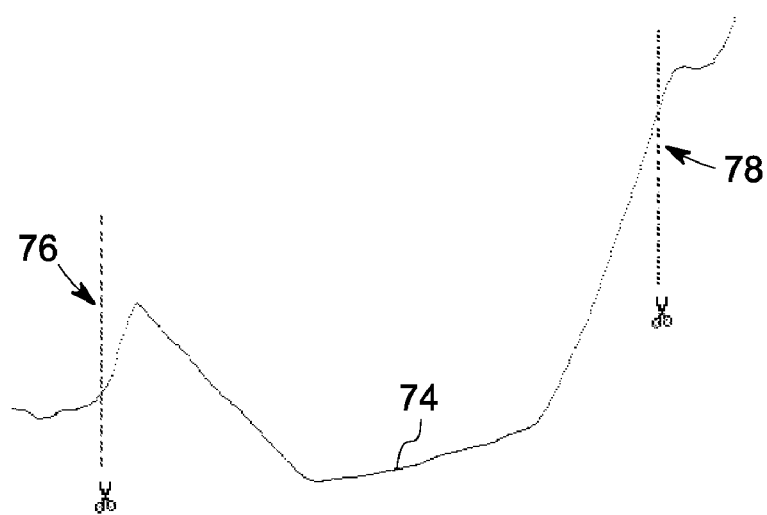
FIG. 7 illustrates removal of noise points from an exemplary profile through line fitting method.
Figure 8:
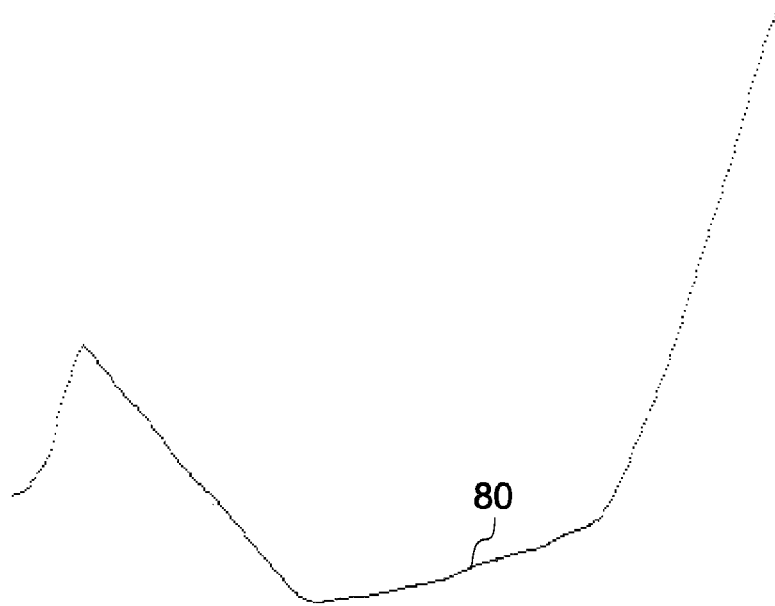
FIG. 8 is a diagrammatical representation of trimmed profile obtained by removing the noise points from the profile of FIG. 7.

FIG. 7 illustrates removal of noise points from an exemplary profile 74 through line fitting method. A plurality of data points are extracted from the profile 74, and line is fitted through a number of continuous data points from the edges. In one embodiment, about seventy-five data points are selected for fitting the line through the points. However, a greater or a lesser data points may be selected. Further, a fitting error for each of the data points is estimated and compared to a predetermined value. Data points having a fitting error greater than the pre-determined value are removed as data points corresponding to noise, as represented by reference numerals 76 and 78. In one exemplary embodiment, the pre-determined value is 0.01. However, the pre-determined value may be defined by the user based upon a desired application. As will be appreciated by one skilled in the art a plurality of line fitting techniques may be employed for removing the data points corresponding to noise. For example, least squares fitting technique may be employed where a sum of squares of offsets or residuals of the points from a curve may be minimized. Thus, the profile 74 is trimmed by the line fitting method for removing data points corresponding to noise to generate a trimmed profile 80, as illustrated in FIG. 8.

Figure 9:
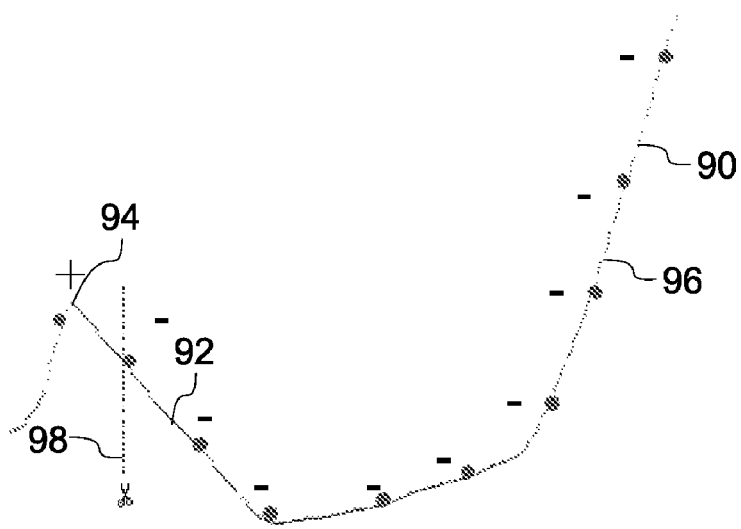
FIG. 9 illustrates removal of data points corresponding to noise from an exemplary profile through Graham Scan method.
Figure 10:
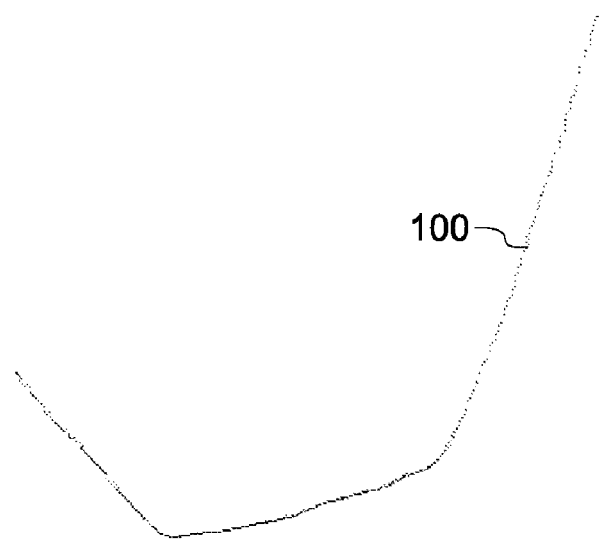
FIG. 10 is a diagrammatical representation of trimmed profile obtained by removing the noise points from the profile of FIG. 9.

FIG. 9 illustrates removal of data points corresponding to noise from an exemplary profile 90 through Graham Scan method. As illustrated, the profile 90 is divided into a plurality of segments such as represented by reference numeral 92. In one exemplary embodiment, the profile 90 is divided into a plurality of segments 92 such that each segment 92 includes about hundred continuous points. Further, if the fitting curve through the points in the segment 92 is convex then that segment is assigned a positive (+) symbol, as represented by reference numeral 94. Alternatively, if the fitting curve through the points in the segment 92 is concave then that segment is assigned a negative (−) symbol, as represented by reference numeral 96. The number of segments having a greater number of either the positive or negative symbol are retained, whereas the segments having the reverse symbol are trimmed from the profile 90. For example, in this embodiment, segments having the negative symbol such as represented by reference numeral 96 are retained, whereas segment having positive symbol such as 94 are trimmed as represented by reference numeral 98 to generate a trimmed profile 100 as illustrated in FIG. 10. The trimmed profile 80 or 100 obtained by trimming through the line fitting and Graham scan is utilized for fitting edge surface planes as described below with reference to FIG. 11.

Figure 11:
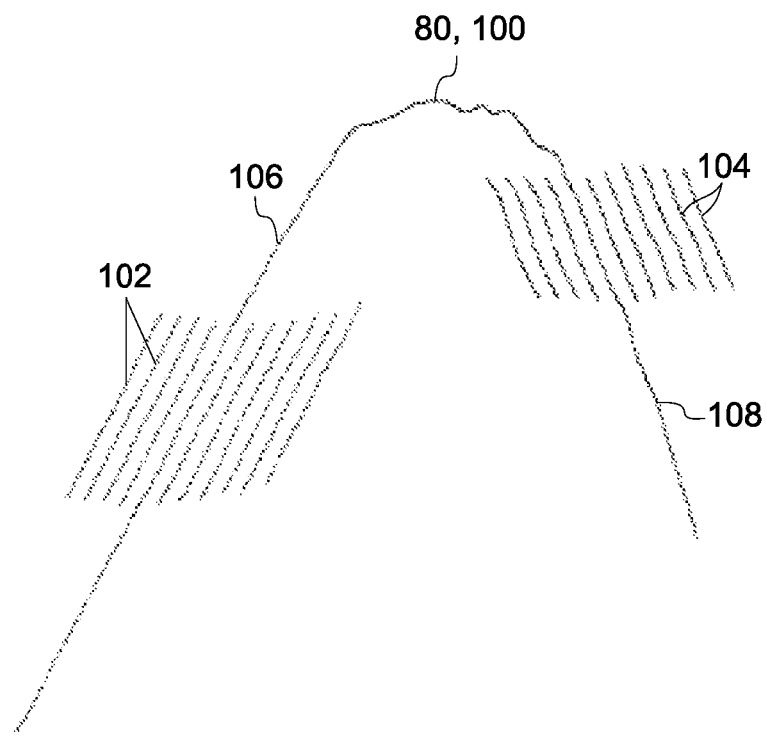
FIG. 11 illustrates extraction of points from the trimmed profiles of FIGS. 7 and 9 for fitting edge planes.
Figure 12:
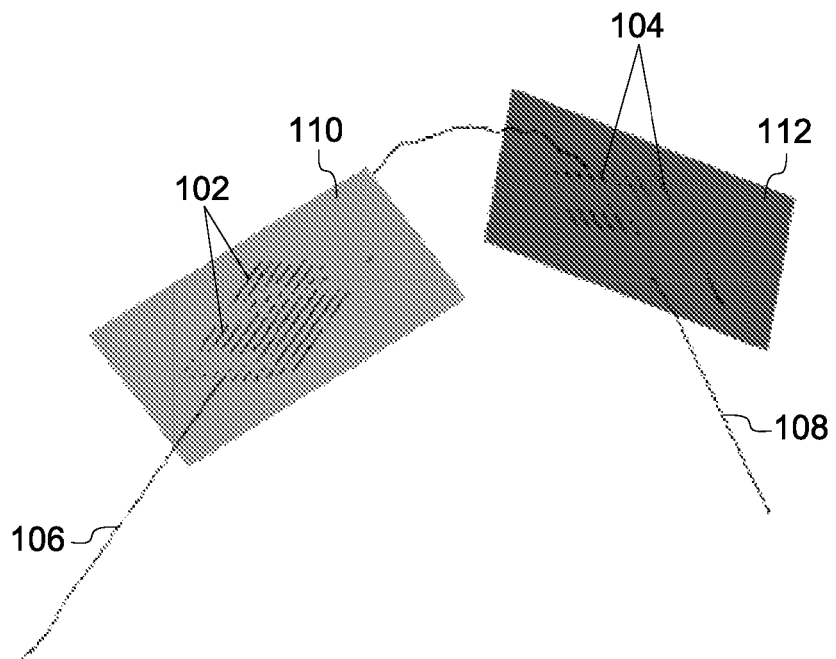
FIG. 12 illustrates exemplary edge planes fitted through the points of FIG. 11.

FIG. 11 illustrates extraction of points from the trimmed profiles 80, 100 of FIGS. 7 and 9 for fitting edge planes. In the illustrated embodiment, a plurality of data points such as represented by reference numerals 102 and 104 corresponding to edges 106 and 108 respectively of the trimmed profile 80, 100 are extracted. Further, two edge surface planes 110 and 112 are fitted through the plurality of data points 102 and 104 as illustrated in FIG. 12. The two edge surface planes 110 and 112 are utilized to generate a compensation plane 120 that is normal to the edge surface planes 110 and 112, as illustrated in FIG. 13.

Figure 13:
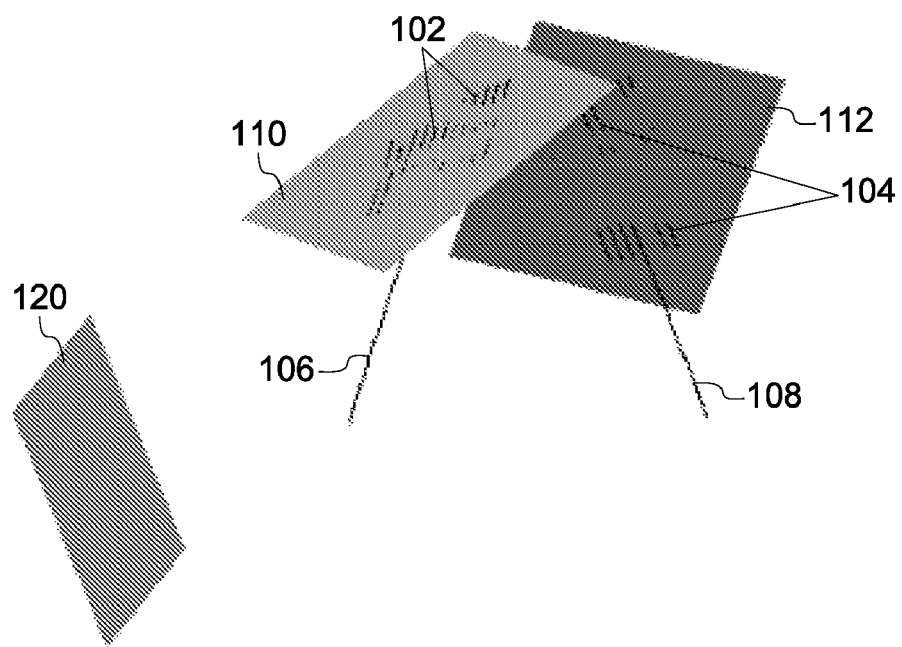
FIG. 13 illustrates an exemplary compensation plane normal to the direction of the edge planes of FIG. 12.
Figure 14:
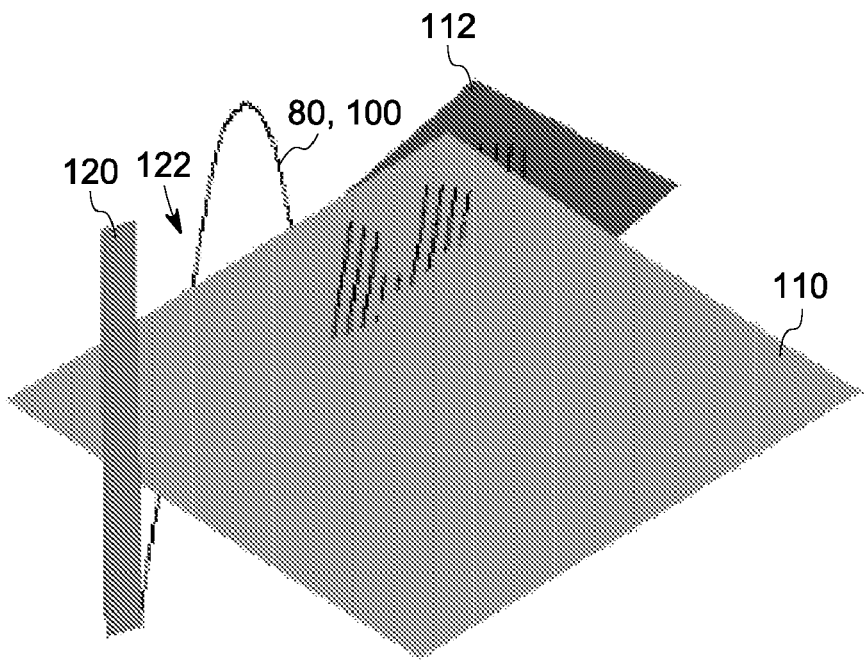
FIG. 14 illustrates projection of the profiles of FIGS. 7 and 9 to the compensation plane of FIG. 13.

FIG. 14 illustrates projection of the profiles 80 and 100 of FIGS. 7 and 9 to the compensation plane 120 of FIG. 13. As illustrated, the trimmed profile 80 or 100 corresponding to the edge break 14 (see FIG. 1) is projected to the compensation plane 120 for generating an updated profile as represented by reference numeral 122. Beneficially, the updated profile 122 is used for reducing the measurement error caused by an orientation of the sensor 22 and for determining the quality of the edge break.

As noted above, by using an algorithm embodying aspects of the present invention, one can obtain an accurate characterization of a feature such as an edge break by reducing the error due to the variation in the sensor orientation. The methods and systems described above provide an automated edge break evaluation process that can be performed with minimal manual interaction from the operator. The edge break characterization can be executed in a few seconds just by clicking a single button or icon in a suitable interface. In addition, the edge break characterization process described above has a high Gage Repeatability and Reproducibility (GR&R), as the process is no longer operator-dependent.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for inspecting a feature of a part, comprising:
   capturing an image corresponding to the feature using a sensor;
   extracting at least one profile from the image using a processor;
   removing a plurality of data points corresponding to noise from the at least one profile to generate at least one trimmed profile using the processor;
   extracting a plurality of data points corresponding to edges of the at least one trimmed profile using the processor;
   fitting two edge surface planes through the plurality of data points corresponding to edges of the at least one trimmed profile using the processor;
   generating a compensation plane normal to the two edge surface planes using the processor; and
   projecting the at least one trimmed profile onto the compensation plane to generate an updated profile using the processor,
   whereby the updated profile is used to reduce a measurement error caused by an orientation of the sensor.

2. The method of claim 1, wherein the step of removing a plurality of data points corresponding to noise from the at least one profile is performed by using one of a line fitting method and a Graham Scan method.

3. The method of claim 1, wherein the updated profile is utilized to determine a quality of the feature.

4. The method of claim 1, wherein the feature comprises an edge break in the part.

5. The method of claim 4, wherein the edge break comprises a chamfer, a bevel, a rounded edge, or a fillet.

6. A method for inspecting an edge break of a part, comprising:
   obtaining an initial profile corresponding to the edge break of the part using a sensor having a plurality of different angular values; and
   determining an orientation of the edge break of the part such that a cross-section of data points along the initial profile is being measured normal to a major axis of the edge break of the part, thereby reducing a measurement error due to an orientation of the sensor.

7. The method of claim 6, wherein the step of determining an orientation of the edge break of the part such that a cross-section of data points along the initial profile is being measured normal to a major axis of the edge break of the part comprises projecting the initial profile along a normal direction.

8. The method of claim 7, further comprising obtaining a plurality of profiles comprising a plurality of edges and removing a plurality of data points in the edges of the profiles corresponding to noise by performing one of a line fitting method and a Graham Scan method.

9. The method of claim 8, further comprising extracting at least ten profiles from a captured image of the initial profile obtained using the sensor.

10. The method of claim 9, further comprising extracting a plurality of data points from the at least ten profiles and fitting two edge planes through the plurality of data points.

11. The method of claim 6, further comprising determining a normal vector and projecting the initial profile along the normal vector.

12. An inspection system for inspecting a feature of a part, comprising:
   a sensor configured to capture an image of the feature on the part; and
   a processor configured to process the image of the feature of the part, extract at least one profile from the image of the feature of the part, remove a plurality of data points corresponding to noise from the at least one profile to generate at least one trimmed profile, extract a plurality of data points corresponding to edges of the at least one trimmed profile, fit two edge surface planes through the plurality of data points corresponding to edges of the at least one trimmed profile, generate a compensation plane normal to the two edge surface planes, and project the at least one trimmed profile onto the compensation plane to generate an updated profile, wherein the updated profile is used by the processor to reduce a measurement error caused by an orientation of the sensor.

13. The inspection system of claim 12, wherein the feature comprises an edge break on the part.

14. The inspection system of claim 13, wherein the edge break comprises a chamfer, a bevel, a rounded edge, or a fillet.

15. The inspection system of claim 12, wherein the processor is configured to remove the plurality of data points corresponding to noise from the at least one profile by performing one of a line fitting method and a Graham Scan method.

* * * * *